(12) United States Patent
Vollmer

(10) Patent No.: US 8,115,360 B2
(45) Date of Patent: Feb. 14, 2012

(54) ELECTRIC MACHINE WITH STEPPED WINDING STRUCTURE

(75) Inventor: Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 204 days.

(21) Appl. No.: 12/505,903

(22) Filed: Jul. 20, 2009

(65) Prior Publication Data

US 2010/0013341 A1 Jan. 21, 2010

(30) Foreign Application Priority Data

Jul. 21, 2008 (EP) ..................................... 08013097

(51) Int. Cl.
*H02K 21/00* (2006.01)
*H02K 21/24* (2006.01)
(52) U.S. Cl. .......................... 310/189; 310/188; 310/208
(58) Field of Classification Search .................. 310/189, 310/208, 188
See application file for complete search history.

(56) References Cited

U.S. PATENT DOCUMENTS

| 1,451,374 | A |  | 4/1923 | Rogers |  |
|---|---|---|---|---|---|
| RE28,161 | E | * | 9/1974 | Bolton | ............................. 310/13 |
| 2006/0181158 | A1 | * | 8/2006 | Tajima et al. ................... | 310/12 |

FOREIGN PATENT DOCUMENTS

| DE | 102005027433 A1 |  | 12/2006 |
| EP | 0180359 A |  | 5/1986 |
| GB | 1285646 A |  | 8/1972 |
| JP | 56153945 A |  | 11/1981 |
| JP | 01122354 A | * | 5/1989 |

* cited by examiner

*Primary Examiner* — Quyen Leung
*Assistant Examiner* — Jose Gonzalez Quinones
(74) *Attorney, Agent, or Firm* — Henry M. Feiereisen; Ursula B. Day

(57) ABSTRACT

An electric machine for direct drive or braking applications with coils providing improved power efficiency and heat transfer is disclosed. The electric machine has a coil body and a winding with a plurality of turns wound on the coil body. Each of the various turns is located in a separate plane. Respective end sections of two different turns are connected by a connecting element, with a major directional component of the connecting element being oriented in an axial direction perpendicular to the plane of one of the two turns. Axially adjacent turns can thereby be connected to one another together. This arrangement reduces or eliminates empty spaces in the slots, particularly when the turns are made from flat wire.

8 Claims, 4 Drawing Sheets

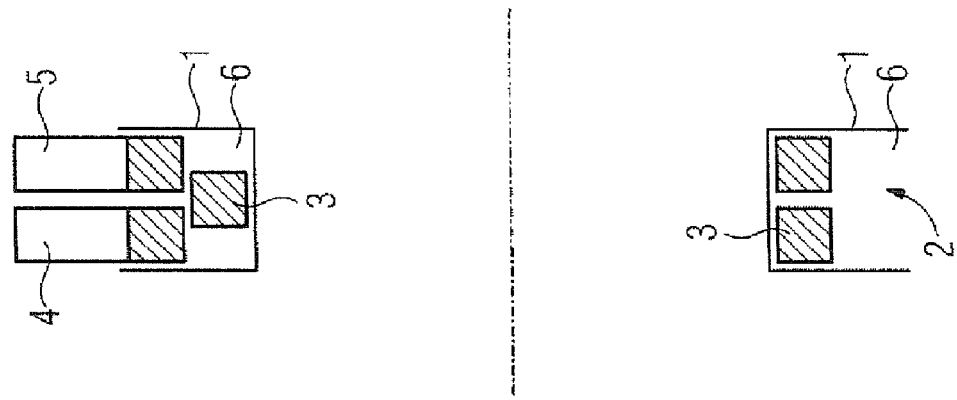
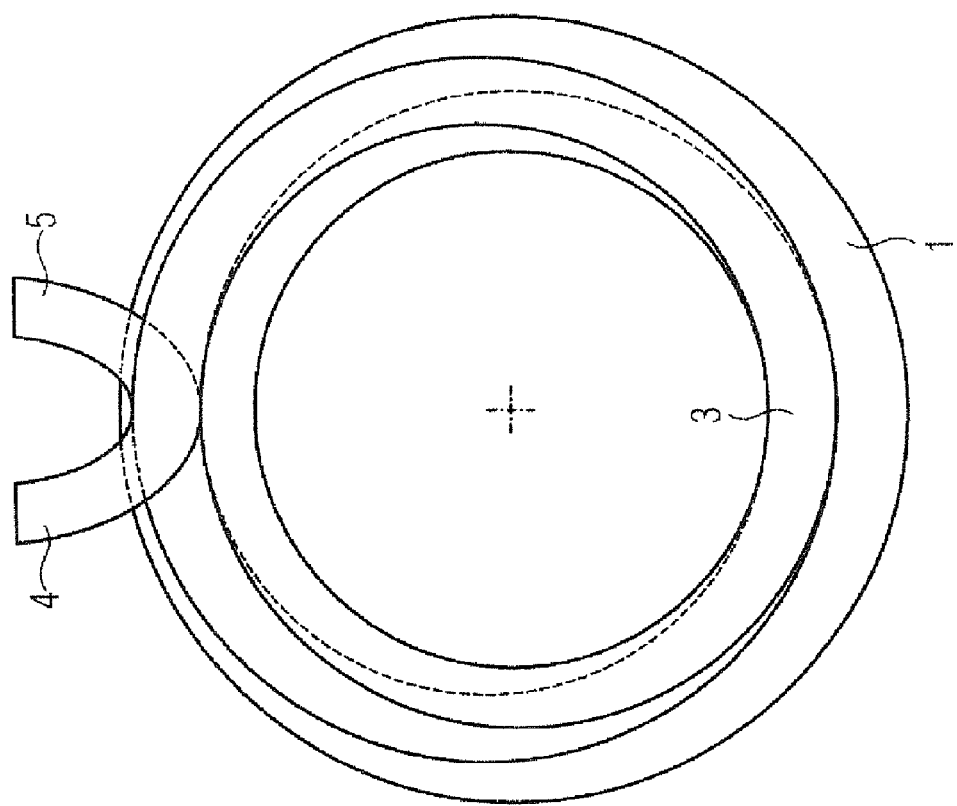

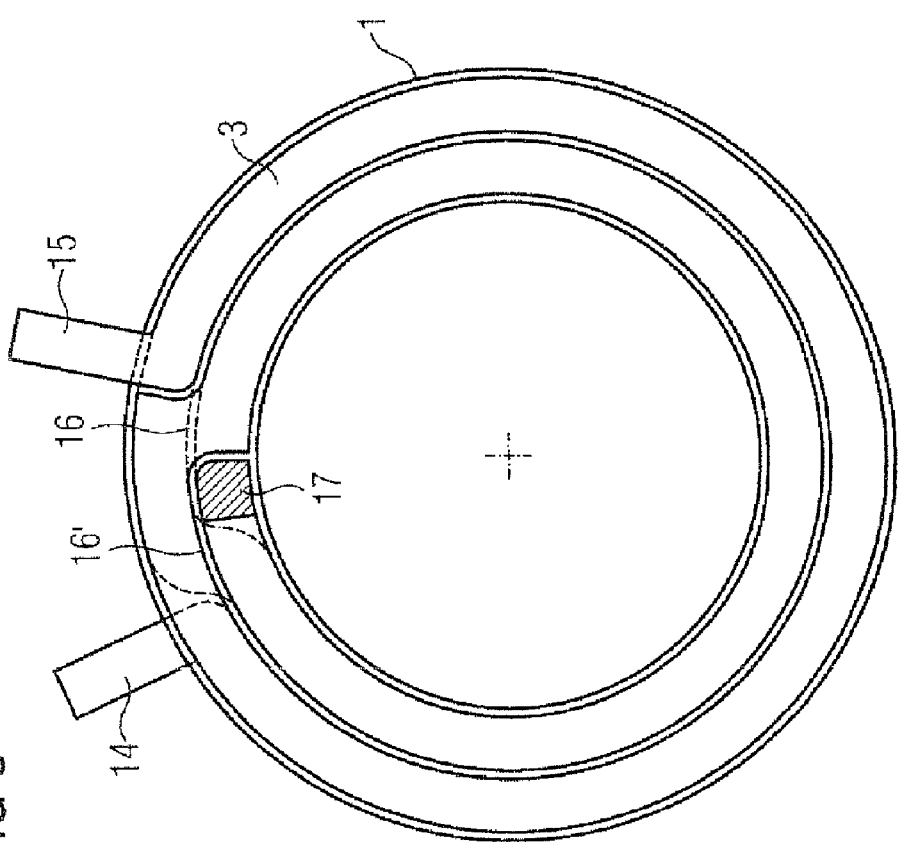
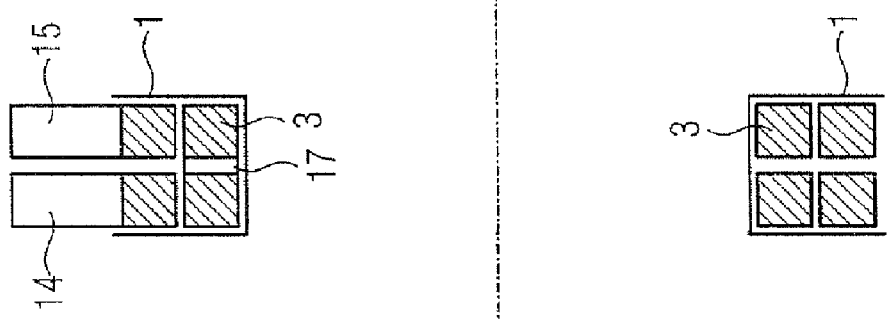
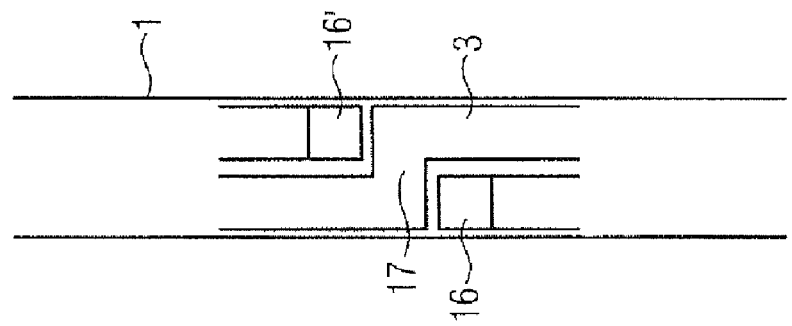

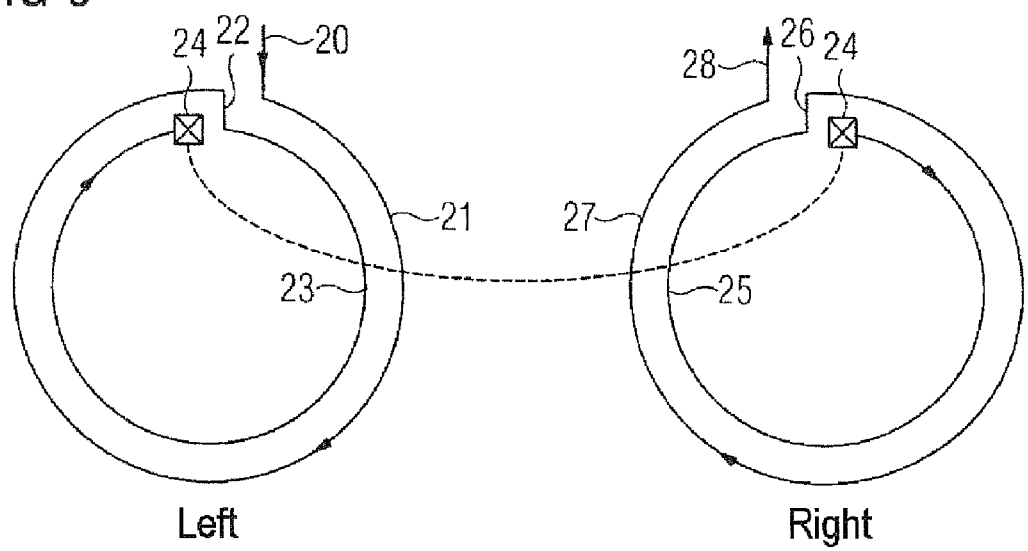
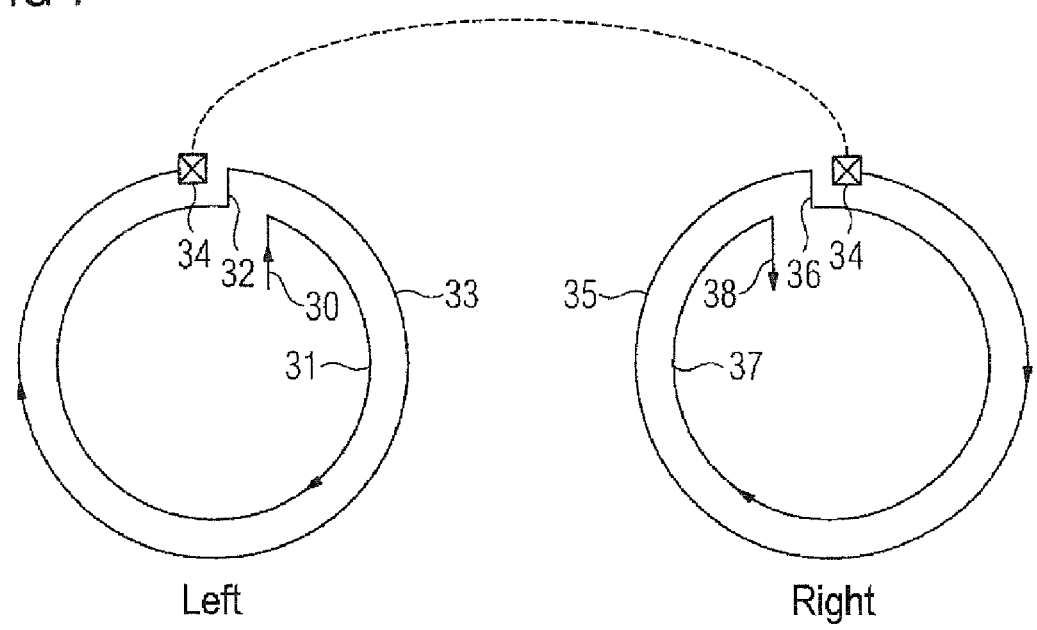

ELECTRIC MACHINE WITH STEPPED WINDING STRUCTURE

CROSS-REFERENCES TO RELATED APPLICATIONS

This application claims the priority of European Patent Application, Serial No. EP 08013097, filed Jul. 21, 2008, pursuant to 35 U.S.C. 119(a)-(d), the content of which is incorporated herein by reference in its entirety as if fully set forth herein.

BACKGROUND OF THE INVENTION

The present invention relates to an electric machine with a coil body and a multi-turn winding wound on the coil body. In particular, the present invention relates to a transverse flux machine or a cylindrical linear motor.

The following discussion of related art is provided to assist the reader in understanding the advantages of the invention, and is not to be construed as an admission that this related art is prior art to this invention.

When coils for electromagnets are manufactured, a wire is usually wound helically in one layer and spirally above one another in a plurality of layers. This results in empty spaces in the regions of the bottom and top layers and at the sides of the windings. The empty spaces result in reduced thermal conductivity and therefore to a lower power efficiency of the system operated with the electromagnet, e.g. a cylindrical linear motor. High utilization is particularly important with electromagnetic direct drives having low field speeds in order to keep costs low. Consequently, attempts are being made to achieve the highest possible slot fill factor.

With known winding methods, which produce spiral or helical windings, higher thermal resistances resulting from the empty spaces are generally accepted. No solutions for reducing the thermal resistance have been implemented to date.

It would therefore be desirable and advantageous to provide an improved winding structure for an electric machine, which obviates prior art shortcomings and is able to specifically increase the efficiency of the electric machine which can be used in a direct drive or braking system.

SUMMARY OF THE INVENTION

According to one aspect of the invention, an electrical machine for direct drive or braking operation includes a coil body and a winding having a plurality of turns wound on the coil body. Each of the plurality of turns is located in a separate plane. Respective end sections of two turns of the plurality of turns are connected by a connecting element, with a major directional component of the connecting element oriented in an axial direction perpendicular to the plane of one of the two turns.

Advantageously, filling of the slots is improved with the winding structure according to the invention. The improved slot fill factor improves the magnetic efficiency while at the same time reducing the thermal resistance. This results in an overall increase in the efficiency of the electric machine.

According to another advantageous feature of the present invention, each of the turns of the electric machine may be designed in the form of a ring. Alternatively, the turns may, of course, also have a rectangular structure or have some other contour.

According to another advantageous feature of the present invention, the plurality of turns may also be arranged radially above one another on concentric circles. This produces a very compact winding not only in the axial, but also in the radial direction. A radial connecting element for connecting turns which are located radially above one another, may advantageously be oriented radially with its main directional component. The orientation of a section of conductor then always corresponds to the direction of the current flowing through this section of conductor. The three-dimensional directional components refer to a cylindrically symmetrical system, with the first directional component extending in the axial direction, the second directional component extending in the radial direction and the third directional component extending in the circumferential direction. The major orientation component of a section of the conductor is then the largest of these three components.

According to yet another advantageous feature of the present invention, the winding may be constructed from a conductor with a rectangular or square cross section. This produces the maximum fill factor of the slots.

According to another advantageous feature of the present invention, the number of turns arranged axially adjacent to one another may be a multiple of 2, with the connections to the winding being located radially on top. A structure of this type may be used particularly for cylindrical linear motors with an interior secondary section.

According to another advantageous feature of the present invention, the number of turns arranged radially above one another can be a multiple of 2, with the connections to the winding being located on an end face of the coil body. This can take a configuration into account where, for example, power can only be supplied to the winding from an end face.

According to still another advantageous feature of the present invention, the connections of the winding may face inward, for example, to drive an external rotor. The winding structure according to the invention can then be used with many different types of drive.

The electric machine according to the invention may be designed as a transverse flux machine or as a cylindrical linear motor. The annular coils with a high slot fill factor can significantly increase the efficiency of such drives.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a conventional flat-wire coil with two turns as viewed in the axial direction;

FIG. 2 shows a cross section of the flat-wire coil of FIG. 1

FIG. 3 shows a flat-wire coil according to the invention with four turns as viewed in the axial direction;

FIG. 4 shows a cross section the flat-wire coil of FIG. 3;

FIG. 5 shows a plan view in the radial direction of the flat-wire coil of FIG. 3;

FIG. 6 shows a first winding scheme for external connections;

FIG. 7 shows a second winding scheme for inwardly directed connections;

DETAILED DESCRIPTION OF PREFERRED EMBODIMENTS

Figure 8:
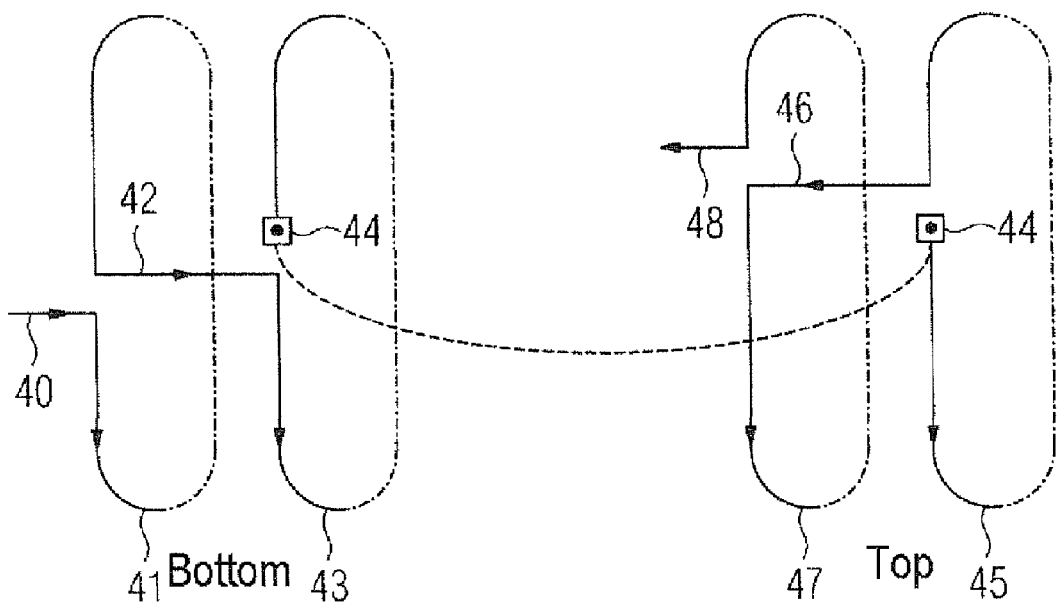
FIG. 8 shows a third winding scheme for side connections.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIGS. 1 and 2, there is shown a conventionally wound flat-wire coil for an electric machine. The coil has a coil body 1 which has a radially outwardly pointing slot 2. A flat wire 3 with a square or rectangular cross section is wound into the slot 2. The depth of the slot is approximately twice the thickness of the flat wire 3. Two complete turns of this flat wire 3 can be wound into the slot 2. The coil connections 4 and 5 both project radially outwardly. The first connection 4 connects to a section of coil which initially runs in the top layer and after half a turn continues in the bottom layer. After an additional half turn, the wire constitutes the only turn in the bottom layer, which can be seen in the top part of FIG. 2. The wire 3 then continues for an additional half turn in the bottom layer, which can be seen in the bottom part of FIG. 2. In the last half turn, the flat wire 3 gradually ascends once more to the top layer and ends at the second connection 5.

The resulting empty spaces 6 can be readily seen in FIG. 2. These empty spaces 6 are created because in the top part of the coil, only one wire 3 runs in the bottom layer, whereas in the bottom part of the coil, the top layer cannot be used at all. With this winding technique, only two turns can be wound into the slot 2, so that the generated magnetic field is reduced accordingly. Furthermore, the thermal resistance from the flat wire 3 through the empty spaces 6 to the coil body 1 is relatively high. The efficiency of the corresponding electric machine is therefore quite low.

In order to increase the efficiency of a direct drive, e.g. a cylindrical linear motor, or of a brake, coils with an alternate winding pattern are proposed. A coil of this kind is shown schematically in FIG. 3 in side view, i.e. in the axial direction. The coil has a stepped winding structure with four turns. With the winding technique according to the invention, twice as many turns can therefore be accommodated in the same coil body 1 as in the example of FIG. 1 and 2. This also doubles the fill factor of the slots. The cross section in FIG. 4 shows that the coil has a top layer and a bottom layer, each having two adjacent turns, i.e., the turns are located above one another in concentric circles and next to one another in parallel planes. The turns are connected radially and axially by suitable connecting elements, which here are also designated as radial steps 16 and 16' respectively and lateral steps 17.

The course of the winding can be explained as follows: The winding begins, for example, at the radially outwardly projecting connection 15 and extends initially, with reference to the cross section of FIG. 4, in the top layer in the right-hand half of the coil body 1. After a complete turn in the top layer, the flat wire 3 is routed to the bottom layer in a radial step 16 (radial connecting element) shortly before the connection piece 15. From here, the flat wire 3 takes an additional complete turn to a lateral step 17 (axial connecting element), from where the wire 3 is fed to the bottom layer of the left-hand half of the coil body 1 shortly before the radial step 16. The flat wire 3 then continues, always in the same direction of rotation, again for a complete turn. Shortly before the lateral step 17, the flat wire 3 is routed up to the top layer in an additional radial step 16'. Here, the wire 3 again runs for a complete turn and finally ends shortly before the radial step 16' in the outwardly projecting connection 14.

FIG. 5 shows a plan view in the radial direction of the coil of FIG. 3. For the sake of clarity, only the two radial steps 16 and 16' in the left-hand and right-hand layer and the lateral step 17 are shown. It can be seen that the steps 16, 17 and 16' are each offset in the circumferential direction. Each individual offset is slightly greater than the thickness of the flat-wire 3.

Four exemplary winding schemes, with which the present invention can be realized, will now be described. The winding scheme of FIG. 6 corresponds to that of the coil of FIG. 3 to 5. In this winding scheme, the left-hand side of the slot of the coil body is wound first and then the right-hand side of the slot. The winding scheme, starting from a first connection 20 (corresponding to connection 15 of FIG. 3) to the second connection 28 (corresponding to connection 14 of FIG. 3), will be briefly explained again to illustrate more clearly the relationship to the real coil (FIG. 3 to 5). Starting from the first connection 20, which projects radially outward, the winding runs in a turn section 21 (here essentially a complete turn, like the other so-called "turn sections") in the top layer to a radial step 22 (16 in FIG. 3) and onwards in a turn section 23 to a lateral step 24. This step 24 is implemented by a connecting element, which runs perpendicular to the drawing plane. The winding scheme continues on the right-hand side of FIG. 6, which is indicated by the dashed connecting line. The turn hence continues from the lateral step 24 via the turn section 25 to the radial step 26 (16' in FIG. 3). From here, it goes via the last turn section 27 in the top layer on the right-hand side to the second connection 28, which is offset with respect to the first connection 20 in the circumferential direction to the left. The two radial steps 22 and 26 are implemented with connecting elements, the main directional component of which runs in the radial direction, i.e. in the plane of the respective turns 21, 23 and 25, 27. The lateral step 24, on the other hand, is implemented with a connecting element, which is oriented in the axial direction, so that the current flows through the flat-wire coil in the lateral step 24 at least approximately in the axial direction. The main directional component of this connecting element is therefore perpendicular to the plane of the coil 23 or 25.

As the connections 20 and 28 project outwardly, the coil arrangement is particularly suitable for interior rotors.

A second winding scheme is shown in FIG. 7. The left-hand layer of the four turns is once again shown on the left-hand side and the right-hand layer on the right-hand side. Here, the connections 30 and 38 are located in the bottom layer and can therefore be directed radially inwardly. However, the connections 30, 38 in the bottom layer can also be routed axially outwardly, which would also be possible in the example of FIG. 6. According to the scheme of FIG. 7, after the first connection 30, the winding initially runs in a first turn section 31 to a radial step 32 and up to the top layer of the left-hand half of the coil. From here, the winding continues in a turn section 33 to a lateral step 34. Here, the winding switches to the other side of the coil. The course of the right-hand coil layer is shown on the right-hand side in FIG. 7. The winding therefore continues in the top layer in a turn section 35 to a radial step 36 just before the lateral step 34. The winding then continues accordingly in the bottom layer in a turn section 37 to the second connection 38.

A third winding scheme is shown in FIG. 8. Here, the winding initially runs via both sides in the bottom layer and then back via both sides in the top layer. The first connection 40 is therefore located on one side in the bottom layer and the second connection 48 is located on the same side in the top layer. Specifically, the winding runs from the first connection 40 via a turn section 41 in the bottom layer to a lateral step 42 (axial connecting element). Here, the winding changes sides and continues in a turn section 43 parallel to the turn section 41 to a radial step 44 realized by a radial connecting element. Here, the winding is routed to the top layer, with the partial winding scheme shown on the right-hand side in FIG. 8. From the radial step 44, the winding continues in a turn section 45 to a lateral step 46 (axial connecting element) where it changes to the left-hand side. Finally, the winding continues in the top layer through a turn section 47 to the second connection 48. The second connection 48 can be routed from the top layer axially to the side or radially to the top as appropriate.

Figure 9:
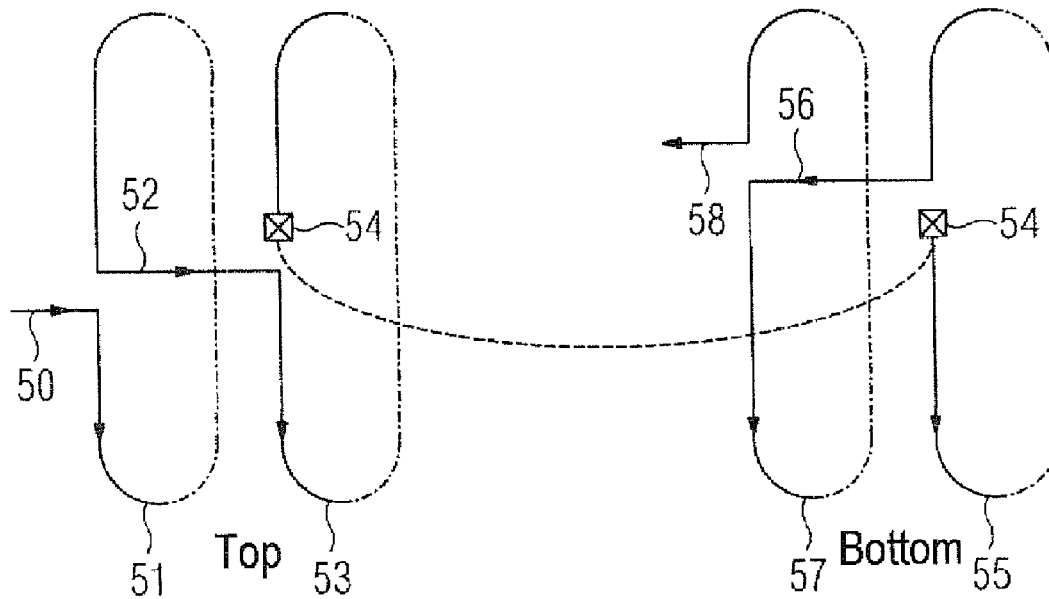
FIG. 9 shows a fourth winding scheme for side connections.

A fourth winding scheme for four turns is shown in FIG. 9. Here, the top layer is wound first and then the bottom layer. Starting from the first connection 50 via a first turn section 51, the winding follows a lateral step 52 and an additional turn section 53 to a radial step 54. Here, the winding is fed to the bottom layer, continues in a turn section 55 to a lateral step 56 and an additional turn section 57 to the second connection 58. Here, the first connection is therefore located in the top layer and the second connection is located in the bottom layer. Both connections can again be routed radially or axially to the outside, where they are located on only one side of the coil, in this case the left-hand side.

It will be understood that the winding scheme is mirror-symmetric, so that the connections in the schemes of FIG. 8 and FIG. 9, for example, may be located on the right-hand side. Likewise, with the schemes of FIG. 6 and FIG. 7, the right-hand layer may be wound first and then the left-hand layer.

The exemplary embodiments here relate to an annular coil geometry. However, the coil geometry can also be rectangular or have an alternative form.

According to the invention, the turns of the coil with a number of turns w>1 are therefore not wound spirally or helically. Rather, each layer of the turns is located on concentric circles, which is attained by a stepped winding pattern. In practical applications, however, prefabricated, slotted rings may also be contacted at steps. Stepped windings can also be attained by laser sintering, casting or similar processes.

The exemplary embodiments of FIGS. 3 to 9 all show coils with four turns. Basically, however, the invention can be realized with any number of turns w>1. However, if connections are to be made only either at the bottom or at the top or only at one side, then the number of turns must be a multiple of 2. In particular, if the connections are only to be at the top or at the outside, then the number of layers of turns axially adjacent to one another must be a multiple of 2.

By using coils with the stepped structure according to the invention, the empty spaces in the regions of the bottom and top layers and the side regions can be eliminated, thus providing an improved thermal connection to parts which conduct heat well. The coils can be precisely fitted in the coil body, resulting in a correspondingly high slot fill factor. The electric machines equipped with these windings can therefore be made more compact and/or operated at higher power.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An electrical machine for direct drive or braking operation, comprising:
    a cylindrical coil body defining a radial and an axial direction,
    a winding having a plurality of turns wound on the coil body, each turn having a circular shape and two end sections, with an end section disposed at each end of the turn in one-to-one correspondence, wherein different turns are arranged radially above or below one another in a plane, with different planes being spaced in the axial direction,
    an axial connecting element connecting respective end sections of two turns of the plurality of turns adjacent to one another in the axial direction with one another, and
    a radial connecting element connecting respective end sections, which are not connected by the axial connecting element, of two turns of the plurality of turns adjacent to one another in the radial direction with one another.

2. The electrical machine of claim 1, wherein each of the turns is U-shaped.

3. The electrical machine of claim 1, wherein the winding comprises a conductor having a rectangular or square cross section.

4. The electrical machine of claim 1, wherein a number of turns adjacent to one another in the axial direction is a multiple of 2, with the winding having outwardly facing connections located radially on top of the winding.

5. The electrical machine of claim 1, wherein a number of turns adjacent to one another in the radial direction is a multiple of 2, said winding having connections located on an end face of the coil body.

6. The electrical machine of claim 1, wherein the winding has connections which face inwardly, for driving an external rotor.

7. The electrical machine of claim 1, embodied as a transverse flux machine.

8. The electrical machine of claim 1, embodied as a cylindrical linear motor.

* * * * *